United States Patent [19]
Lebkuchner et al.

[11] Patent Number: 5,988,201
[45] Date of Patent: Nov. 23, 1999

[54] AUTOMATIC VENT HAVING A MULTI-HINGED VALVE

[75] Inventors: Benno Lebkuchner, Warwick; Kenneth Sundberg, Cranston, both of R.I.

[73] Assignee: Sparco, Inc., Warwick, R.I.

[21] Appl. No.: 09/127,047

[22] Filed: Jul. 31, 1998

[51] Int. Cl.[6] .................................................. F16K 24/04
[52] U.S. Cl. ........................................... 137/202; 137/448
[58] Field of Search ...................................... 137/202, 448

[56] References Cited

U.S. PATENT DOCUMENTS

| | | |
|---|---|---|
| 2,677,387 | 5/1954 | Crawford . |
| 3,002,522 | 10/1961 | Klinefelter . |
| 3,018,787 | 1/1962 | Kirk, Jr. . |
| 3,394,724 | 7/1968 | Klinefelter . |
| 3,586,032 | 6/1971 | Weinstein ................................ 137/202 |
| 3,599,659 | 8/1971 | Nuter . |
| 4,299,248 | 11/1981 | Becker et al. . |
| 4,387,733 | 6/1983 | Balazs et al. ....................... 137/448 X |
| 4,886,089 | 12/1989 | Gabrlik et al. ........................... 137/202 |
| 5,313,977 | 5/1994 | Bergsma et al. .................... 137/202 X |
| 5,379,795 | 1/1995 | Hartley et al. ........................... 137/202 |
| 5,575,031 | 11/1996 | Mertens .................................. 137/202 |
| 5,592,963 | 1/1997 | Bucci et al. ............................. 137/202 |

*Primary Examiner*—Gerald A. Michalsky
*Attorney, Agent, or Firm*—Salter & Michaelson

[57] ABSTRACT

An automatic vent has a cup including a bottom wall, a side wall, an open top, and an inlet for introducing fluid into a compartment defined by the bottom and side walls. A valve assembly of the automatic vent includes a cap disposed over the open top of the cup. The cap has a body with an upwardly facing surface, a downwardly facing surface, a bore formed within the body for enabling fluid communication between the compartment and atmosphere, and an annular rim provided around the bore on the downwardly facing surface. A lever arm is hingedly connected at one end thereof to the body of the cap adjacent the annular rim. The automatic vent further includes a multi-hinged connection for hingedly moving the lever arm between a closed position in which the lever arm blocks the bore of the cap in response to the fluid level in the compartment rising above a predetermined fluid level, a partially open position in which the lever arm hingedly moves away from the cap but still engages the annular rim to allow gas to escape through the bore in response to the fluid level in the compartment lowering below the predetermined fluid level as a result of gas build up within the compartment, and an open position in which the lever arm hingedly moves away from the cap and annular rim in response to the fluid level in the compartment lowering substantially below the predetermined level.

13 Claims, 7 Drawing Sheets

AUTOMATIC VENT HAVING A MULTI-HINGED VALVE

BACKGROUND OF THE INVENTION

This invention relates generally to automatic vents used in heating and/or cooling systems, and more particularly to an automatic vent having a multi-hinged valve that allows the automatic vent to operate at a greater pressure differential within a compartment of the system intended to vent gas.

Automatic vents provided in heating and/or cooling systems are well known in the art. Reference can be made to U.S. Pat. Nos. 2,677,387 to Crawford, 3,002,522 to Klinefelter, 3,018,787 to Kirk, Jr., 3,394,724 to Klinefelter, 3,599,659 to Nuter, and 4,299,248 to Becker et al. as representative prior art in this area. The function of such a vent is to automatically vent unwanted gases from a compartment intended to contain fluids to a surrounding compartment containing only gases. The fluid compartment is under higher pressure than the surrounding compartment. In a hot water heating system, gas (e.g., air) initially present in the system prior to the system being filled with fluid (e.g., water) or air dissolved in the water and later liberated as the water temperature rises moves from the compartment to the surrounding compartment. The automatic vent exhausts the gas to the surrounding compartment thereby, removing air from the system.

Figure 1:
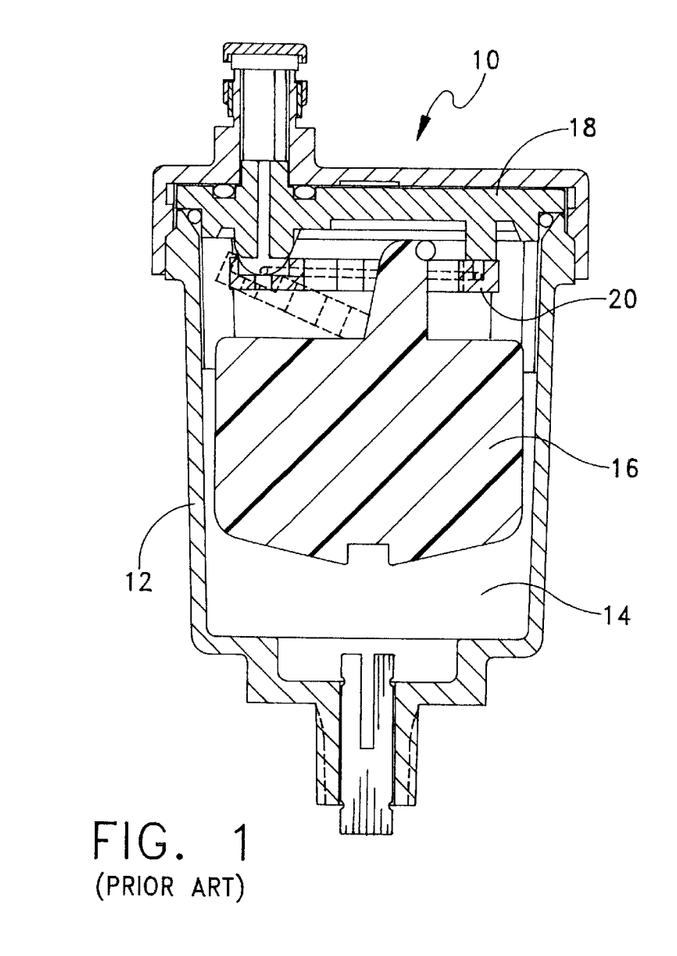
FIG. 1 is an elevational, cross-sectional view of a prior art automatic vent having a valve in a closed position.
Figure 2:
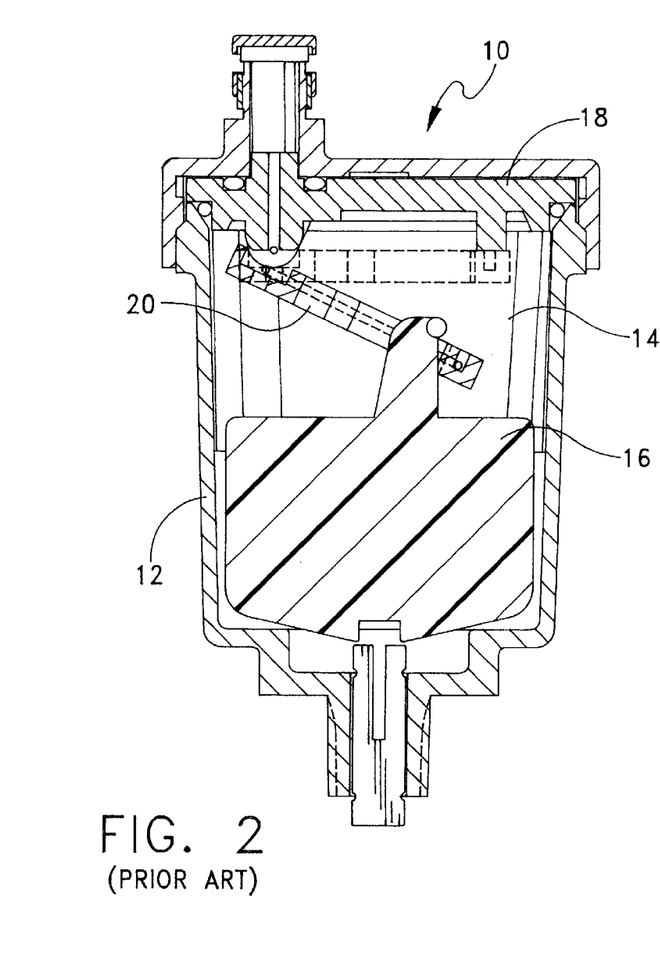
FIG. 2 is an elevational, cross-sectional view of the prior art automatic vent shown in FIG. 1 with the valve in an open position.

Referring to FIGS. 1 and 2, which illustrate a typical prior art automatic vent generally indicated at 10, the automatic vent 10 comprises a cup 12 that defines a compartment 14, a float 16 that is positioned within the compartment 14, and a close off valve assembly 18 that covers the upper end of the cup 12. Preferably, the automatic vent 10 is positioned at the high point of the system. Due to buoyancy, gas (air) rises to the high point and enters the cup 12 from the system. As more gas accumulates within the cup 12, the fluid (water) level and the float 16 recedes or moves downwardly within the cup 12 thereby causing a valve 20 of the close off valve assembly 18 to open. As gas is being expelled from the automatic vent 10, the fluid level and the float 16 rise again within the cup 12 while the close off valve 20 closes. In this manner, only gas (air) is vented while the fluid (water) is retained in the pressurized compartment of the cup 12.

The valve assembly 18 and float 16 combine to form what is typically called in the industry a "floating lever" mechanism. Floating levers have advantages and disadvantages as compared with other designs. One advantage is that they are largely self-cleaning, thus less susceptible to dirt contamination. Another advantage is that they provide a higher venting rate than other vent designs. The main disadvantage of floating levers is that they offer a relatively reduced pressure differential in which gas is vented from the compartment to atmosphere.

SUMMARY OF THE INVENTION

The present invention is directed to an automatic vent comprising a cup including a bottom wall, a side wall, an open top, and means for introducing fluid into a compartment defined by the bottom and side walls. A valve assembly of the automatic vent includes a cap disposed over the open top of the cup. The cap has a body with an upwardly facing surface, a downwardly facing surface, a bore formed within the body for enabling fluid communication between the compartment and atmosphere, and an annular rim provided around the bore on the downwardly facing surface. A lever arm is hingedly connected at one end thereof to the body of the cap adjacent the annular rim. The automatic vent further comprises means for hingedly moving the lever arm between a closed position in which the lever arm blocks the bore of the cap in response to the fluid level in the compartment rising above a predetermined fluid level, a partially open position in which the lever arm hingedly moves away from the cap but still engages the annular rim to allow gas to escape through the bore in response to the fluid level in the compartment lowering below the predetermined fluid level as a result of gas build up within the compartment, and an open position in which the lever arm hingedly moves away from the cap and annular rim in response to the fluid level in the compartment lowering substantially below the predetermined level.

Accordingly, among the several objects of the present invention are: the provision of an automatic vent that allows for greater pressure differential within a compartment of a heating and/or cooling system intended to vent gas without reducing the venting rate of the gas from the compartment; the provision of such an automatic vent that prevents throttling from occurring; the provision of such an automatic vent that is simple in design and cost effective to implement; and the provision of such an automatic vent that effectively vents gas from the system.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Referring now to the drawings, and more particularly to FIGS. 3–6, there is generally indicated at 30 an automatic vent of the present invention. As will be discussed in greater detail below, the automatic vent 30 is especially suited for venting gas (air) from a heating and/or cooling system (not shown) while increasing the pressure differential at which gas is vented from the system without negatively impacting the venting rate. It should be noted that heating and/or cooling systems for which the present invention is intended are well known in the art and require no further description.

As shown, the automatic vent 30 comprises a cup, generally indicated at 32, a valve assembly, generally indicated at 34, and a float, generally indicated at 36. The arrangement of these components is similar to that of prior art automatic vents in that the float 36 is disposed within the cup 32 so that it interacts with the valve assembly 34 to vent gas from the cup 32 as the liquid level drops due to the build up of gas within the cup 32. However, the particular construction of the valve assembly 34 along with its interaction with the float 36 forms the basis of the present invention.

Figure 3:
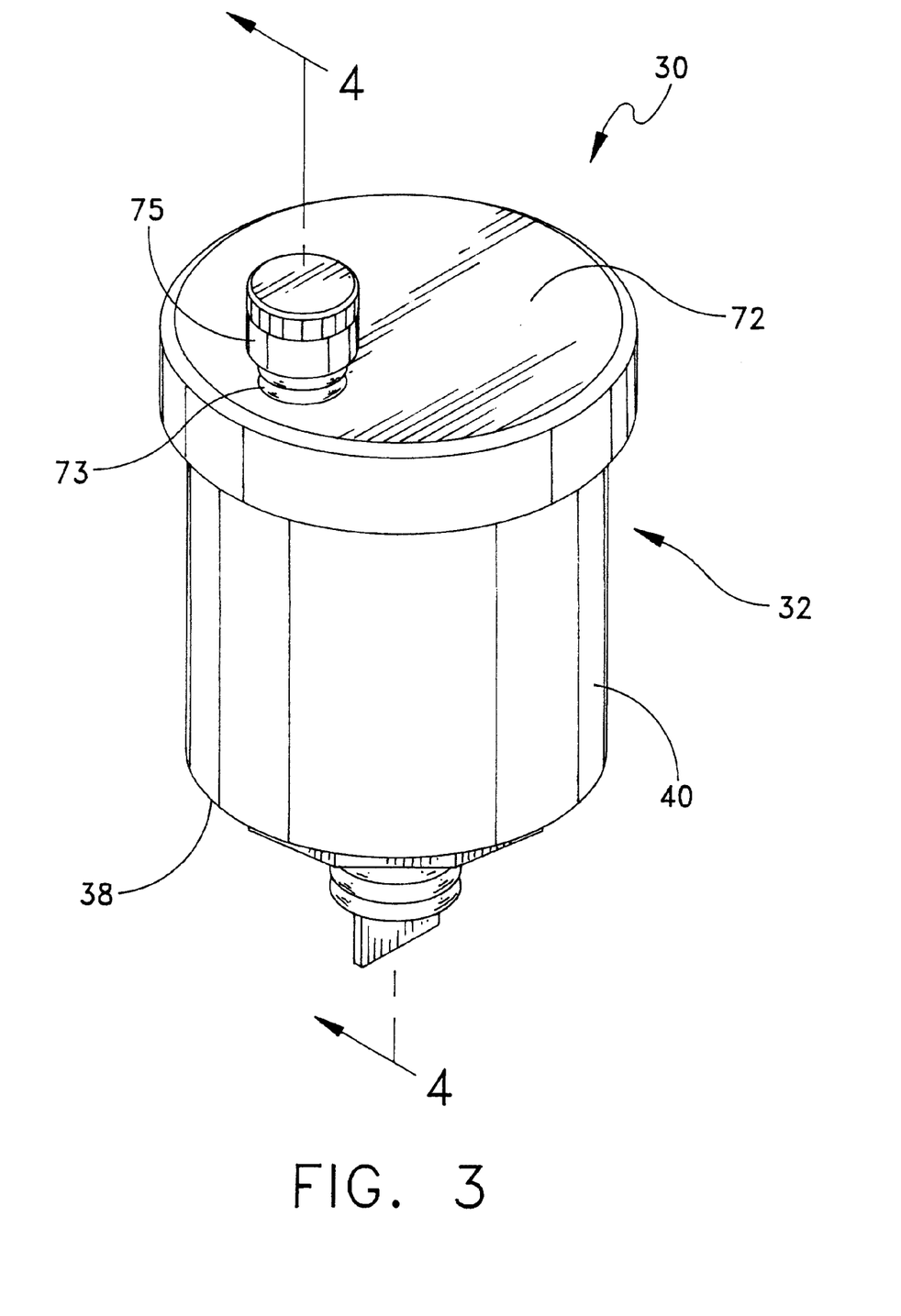
FIG. 3 is a perspective view of the automatic vent of the instant invention.
Figure 4:
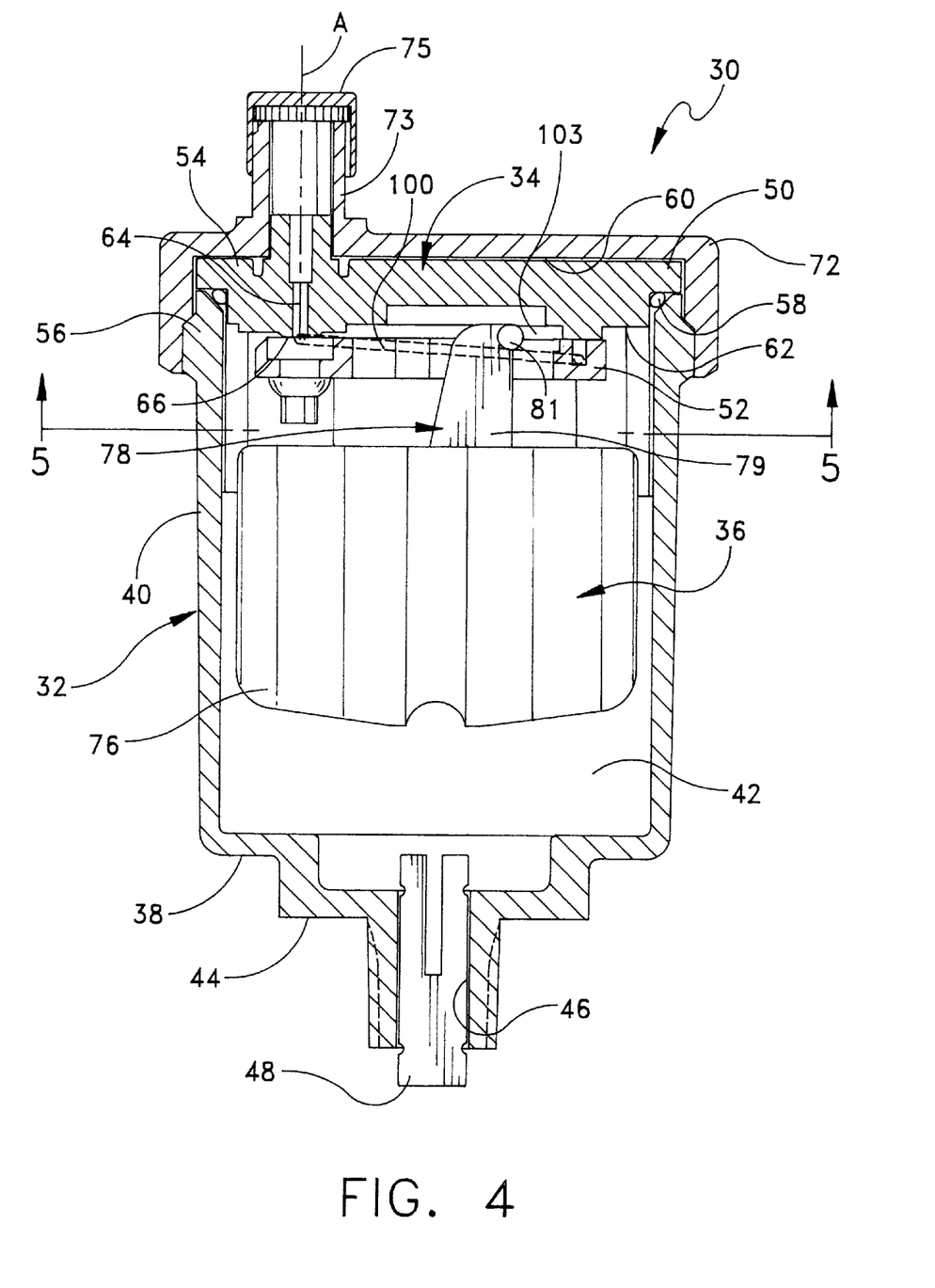
FIG. 4 is an elevational, cross-sectional view of an automatic vent of the present invention taken along line 4—4 of FIG. 3, the automatic vent having a multi-hinged valve assembly illustrated in a closed position.

The cup 32 is relatively simple in design in that it includes a bottom wall 38 and an annular side wall 40 integrally formed with the bottom wall 38. As shown in FIG. 3, the cup 32 is circularly-shaped; however, it could have any suitable cross section and still fall within the scope of the instant invention. The bottom and side walls 38, 40 combine to define a compartment 42 which is sized to freely receive the float 36 therein, i.e., the float 36 is allowed to freely rise and fall within the cup 32. The bottom wall 40 of the cup 32 has a step formation at 44 which is constructed to create an inlet 46 that receives a baffle or vacuum breaker 48. The baffle 48 facilitates the simultaneous movement of air into the compartment 42 and water out of the compartment 42. As stated above, the cup 32 is preferably located at a high point of the system so that the gas (air) rises to the automatic vent 30 for venting gas from the system. Air pockets within the system are undesirable since they can cause knocking within the pipes of the system, among other things.

Still referring to FIGS. 3–6, the valve assembly 34 includes a cap 50 that is disposed over the open top of the cup 32, and a lever arm 52 hingedly connected to the cap 50 within the compartment 42 of the cup 32. Specifically, the cap 50 has a circularly-shaped body 54 that sealingly engages an upper edge 56 of the side wall 40 of the cup 32 by means of a seal 58. The body 54 of the cap 50 has an upwardly facing surface 60 and a downwardly facing surface 62 that faces the interior of the compartment 42 of the cup 32. A bore 64 is formed perpendicularly with respect to the upwardly and downwardly facing surfaces 60, 62 within the body 54 of the cap 50 along axis A for enabling fluid communication between the compartment 42 of the cup 32 and atmosphere. The arrangement is such that the lever arm 52 and the bore 64 define a valve through which gas is selectively exhausted from the compartment 42 of the cup 32.

The body 54 of the cap 50 further has an annular rim 66 provided around the bore 64 on the downwardly facing surface 62 of the body 54, the purpose of which will become apparent as the detailed description of the automatic vent 30 proceeds. As shown throughout FIGS. 4–9, the annular rim 66 includes a horizontal surface 68 and a beveled surface 70. It should be pointed out that the provision of the beveled surface 70 is not required since a perpendicular surface could operate effectively as well; however, the beveled surface 70 is preferred. Preferably, a cover 72 is provided for encapsulating the cap 50 with respect to the cup 32 and for preventing the axial movement of the cap 50 away from the cup 32 along axis A during operation of the automatic vent 30. Cover 72 includes a venting port 73 onto which a cap 75 may be adjustably mounted to prevent water from being ejected to atmosphere in the case of a malfunction in the vent.

Figure 5:
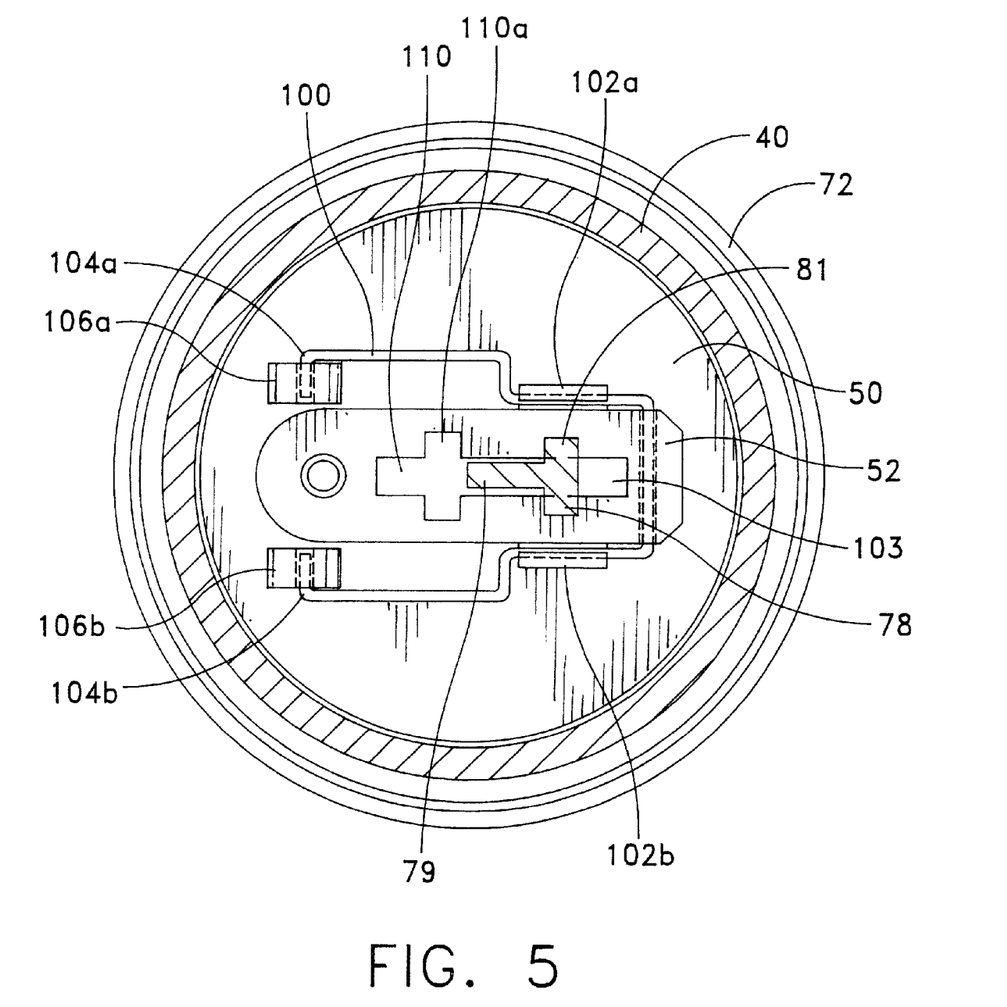
FIG. 5 is an elevational, cross-sectional view of an automatic vent of the present invention taken along line 5—5 of FIG. 4.

As shown in FIG. 5, the lever arm 52 is hingedly coupled to cap 50 by means of a spring clip 100, which is generally U-shaped and is attached to lever arm 52 by a pair of clips 102a and 102b. The ends 104a and 104b of spring clip 100 are respectively mounted within sockets 106a and 106b. Ends 104a and 104b of spring clip 100 are mounted within sockets 106a and 106b so as to lightly bias lever arm 52 in the closed position shown in FIG. 4. This arrangement enables the multi-hinged movement described below.

The lever arm 52 includes a T-shaped slot 110 including an end 103 and a transverse opening 110a for enabling an arm portion 78 of the float 36 to be slidably attached to lever arm 52 as described in more detail below.

Figure 6:
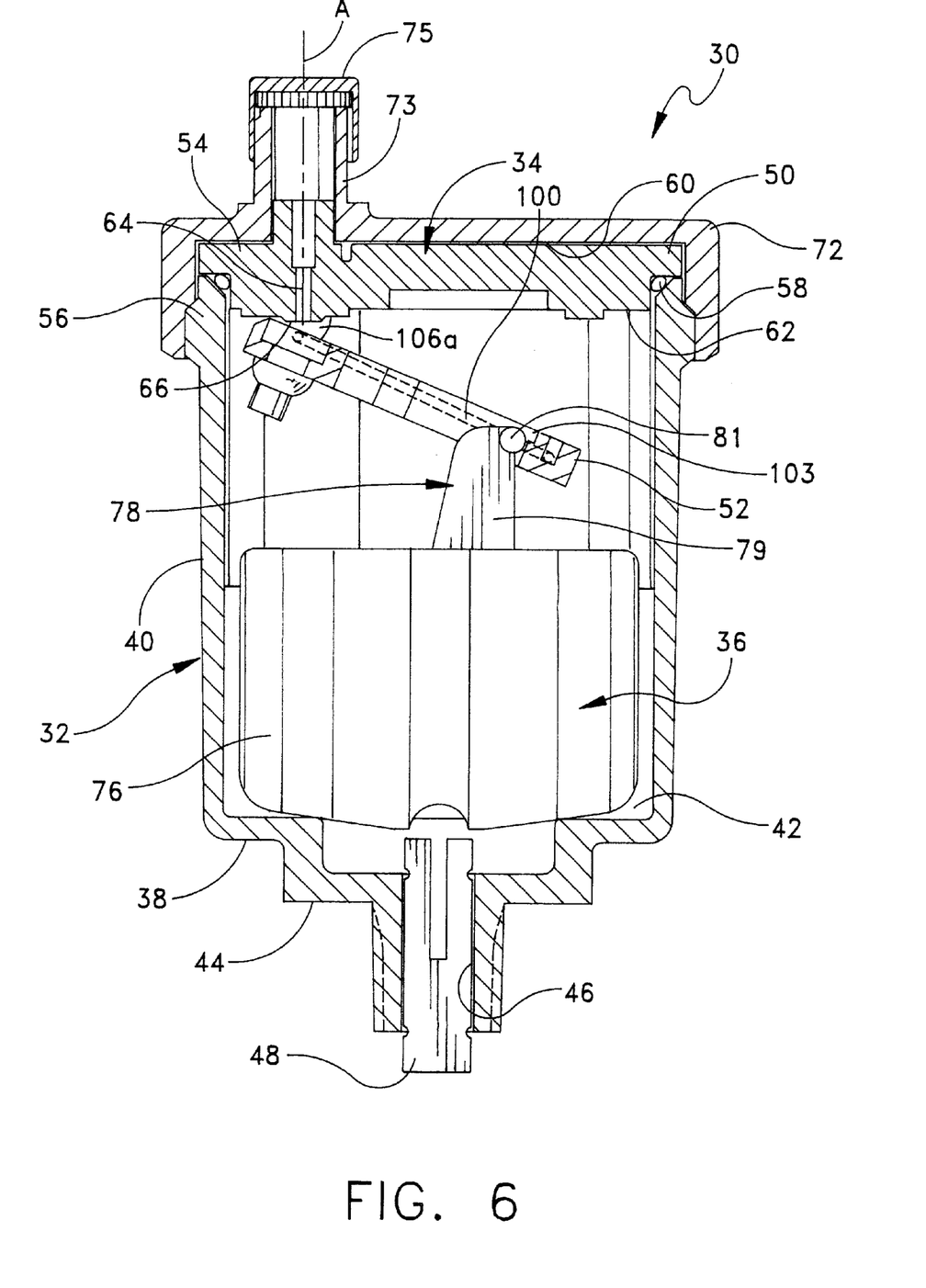
FIG. 6 is an elevational, cross-sectional view of the automatic vent illustrated in FIG. 3, taken along line 4—4 of FIG. 3, with the multi-hinged valve assembly in a completely open position.

The float 36 moves in response to the change of water level within the compartment 42 of the cup 32. Specifically, as the water level in the cup 32 rises, so does the float 36. Conversely, the float 36 recedes within the cup 32 as the water level in the cup 32 recedes. The float 36 includes a relatively large body portion 76 and an upwardly projecting arm portion 78. Arm portion 78 includes a vertical fin 79 and a transverse portion 81 mounted on the top end of vertical portion 79. Arm portion 78 is coupled to lever arm 52 by inserting transverse portion 81 of arm portion 78 into the transverse opening 110a of lever arm 52, and sliding vertical fin 79 along slot 110 as shown in FIG. 5. This configuration enables lever arm 52 to travel between the open and closed positions as float 36 travels vertically in response to a change of the water level within compartment 42. For example, in FIG. 4, when lever arm 52 is in the closed position, transverse portion 81 of arm portion is at an intermediate position between transverse opening 110a and end 103 within slot 110, while, as shown in FIG. 6, when lever arm 52 is in the open position, transverse portion 81 of arm portion 78 is located at the end 103 of slot 110.

The float 36 is of standard construction in that it floats in fluid thereby enabling the performance described above. In this manner, the float 36 serves a dual function. On the one hand, it must be lighter than fluid, e.g., water, so that it floats in the fluid. On the other hand, it should be as heavy as possible so that it imparts as much torque on the lever arm 52 as possible in order for the automatic vent 30 to open against a high internal pressure within the compartment 42. In this regard, the float is made from solid polypropylene which has a specific gravity of less than 1.0 gram per cubic centimeter.

Figure 7:
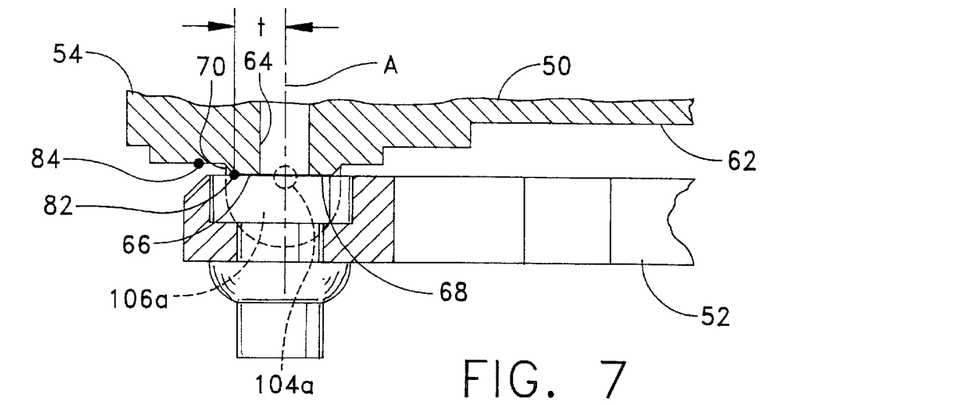
FIGS. 7–9 are enlarged, cross-sectional views illustrating the multi-hinged valve assembly in closed, partially open and completely open positions, respectively.
Figure 8:
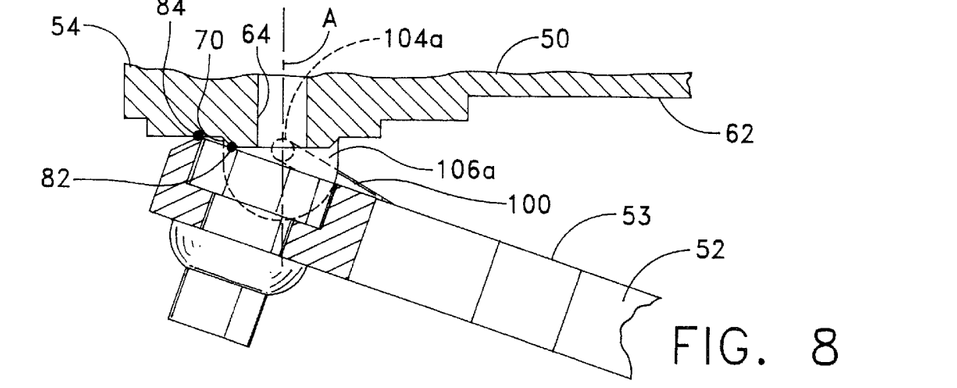
Figure 9:
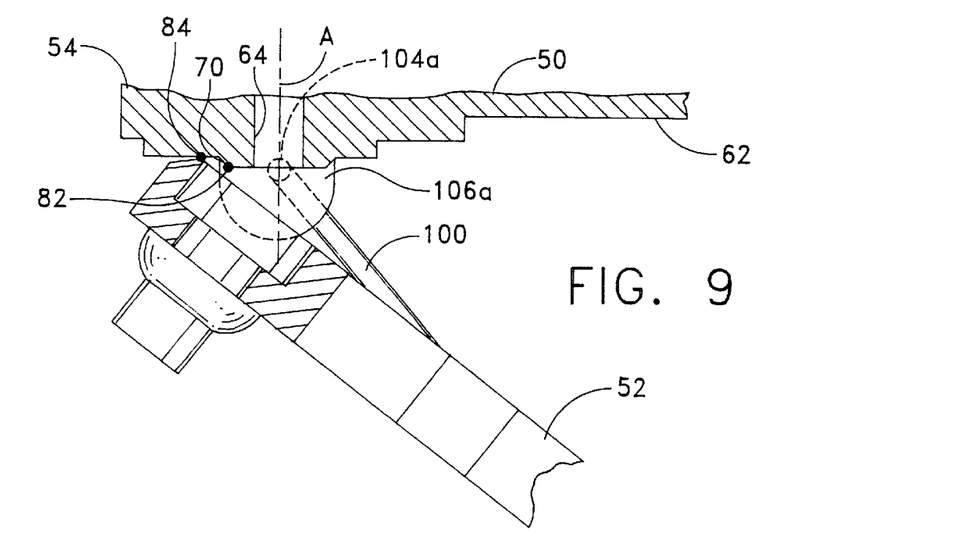

Referring to FIGS. 7–9, the float 36 and the hinge construction of the lever arm 52 move the lever arm 52 between a closed position (FIG. 7) in which the lever arm 52 blocks the opening to the bore 64 of the cap 50 in response to the fluid level in the compartment 42 rising above a predetermined fluid level, a partially open position (FIG. 8) in which the lever arm 52 hingedly moves away from the cap 50 but still engages the annular rim 66 to allow a narrow stream of gas to escape through the bore 64 in response to the fluid level in the compartment 42 lowering below the predetermined fluid level as a result of gas build up within the compartment 42, and an open position (FIG. 9) in which the lever arm 52 hingedly moves away from the cap 50 and annular rim 66 in response to the fluid level in the compartment 42 lowering substantially below the predetermined level. This construction enables the automatic vent 30 to operate at greater pressure differentials than prior art automatic vents.

Turning specifically to FIGS. 7–9, it has been discovered that the physical size and the venting rate of the automatic vent 30 are determined by a dimension t which is the distance between axis A of the bore 64 and a first pivot point 82 located on the edge of the annular rim 66 about which the lever arm 52 rotates when moving from its closed position to its partially open position.

Figure 10:
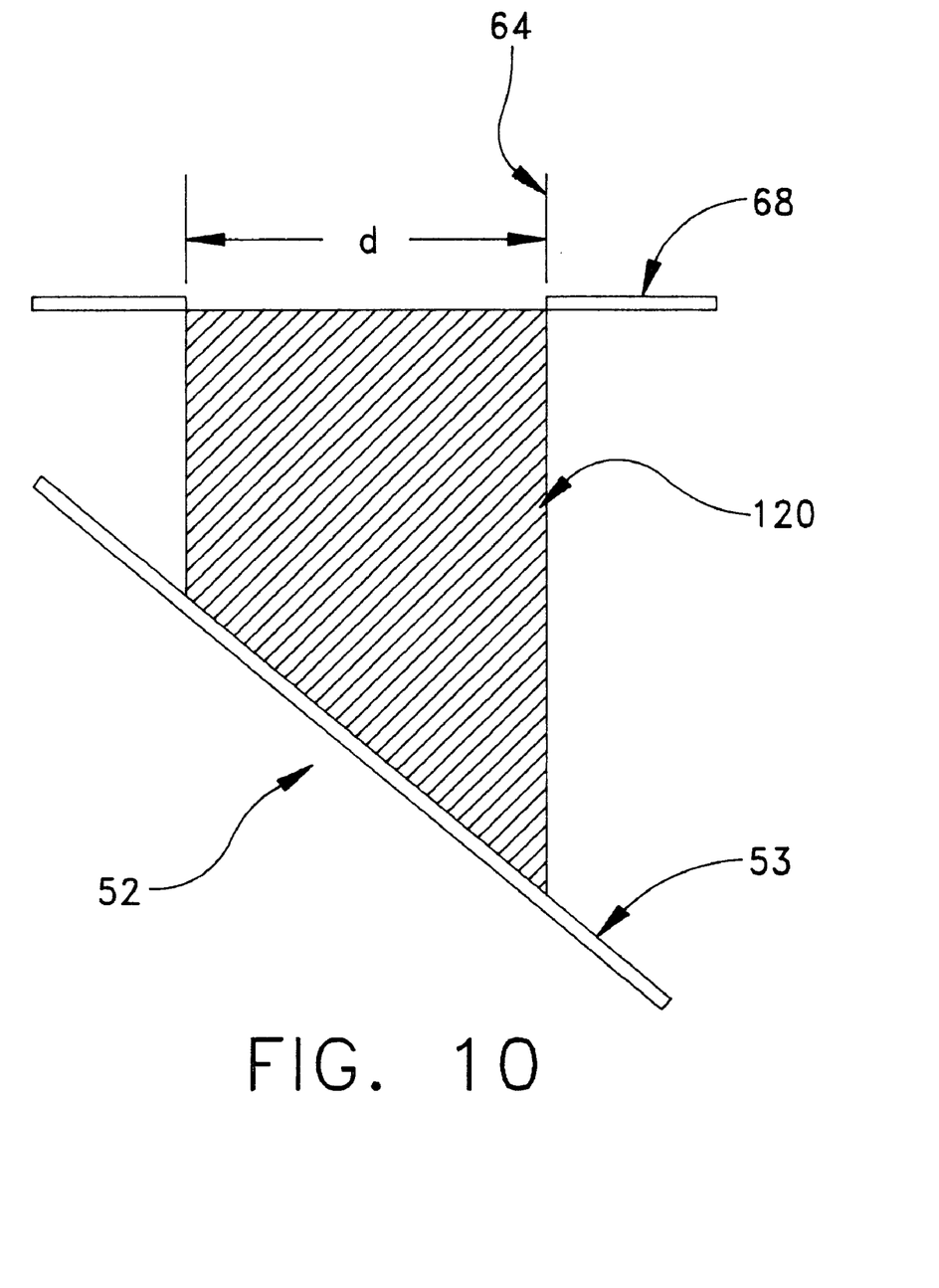
FIG. 10 is a schematic drawing which shows a cylinder which is formed between sections of the valve assembly, which cylinder is used to determine certain dimensions of the valve assembly of the present invention.

In order to not excessively throttle the flow of air in the vicinity of the entrance of the bore 64, the surface area of the round surface of a cylinder having a circumference which is the same as the circumference of bore 64 and which extends from horizontal surface 68 to the top surface 53 of lever arm 52, as lever arm 52 slopes downward as shown in FIG. 8, is preferably considerably larger than the cross-sectional area of the bore 64. This concept is shown in more detail in FIG. 10, which is a schematic drawing which shows the above-described cylinder. As shown in FIG. 10, the cylinder 120 has a circumference which is the same as the circumference of bore 64, which is the diameter d of bore 64 multiplied by Π. Cylinder 120, shown shaded in FIG. 10, extends from horizontal surface 68 to top surface 53 of lever arm 52. As the slope of lever arm 52 increases, the surface area of the round surface of a cylinder 120 also increases. In the preferred embodiment, as described above, the surface area of the round surface of cylinder 120 is greater than the cross-sectional area of bore 64, which is $d^2 \cdot \Pi \cdot 0.25$. However, to have sufficiently large pressure differential capability, the distance t should be as small as possible.

The solution to these competing interests is by providing a second pivot point 84 about which the lever arm 52 rotates when moving from its partially open position to its completely open position. The rationale behind this theory is that as soon as the lever arm 52 of the vent 30 is cracked open to its partially open position, the closing force on the lever arm 52 becomes negligible. After the closing force on the lever arm 52 is at a minimum, it is no longer necessary to have a small distance t, thus t can be made greater by enabling the lever arm 52 to pivot about the second pivot point 84 which is spaced further from axis A of the bore 64 than the first pivot point 82. It should be understood that the manner in which the lever arm 52 is hingedly connected to the cap 50 enables the lever arm 52 to selectively rotate about its first and second pivot points 82, 84.

Thus, it can therefore be seen that for the reasons set forth above, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An automatic vent comprising:
    a cup including a bottom wall, a side wall, said bottom and side walls defining a compartment, an open top, and means for introducing fluid into the compartment;
    a valve assembly including
        a cap disposed over the open top of the cup, the cap having a body with an upwardly facing surface, a downwardly facing surface, a bore formed within the body for enabling fluid communication between the compartment and atmosphere, and an annular rim provided around the bore on the downwardly facing surface, and
        a lever arm hingedly connected at one end thereof to the body of the cap adjacent the annular rim; and
    means for hingedly moving said lever arm between a closed position in which the lever arm blocks the bore of the cap in response to the fluid level in the compartment rising above a predetermined fluid level, a partially open position in which the lever arm hingedly moves away from the cap but still engages the annular rim to allow gas to escape through the bore in response to the fluid level in the compartment lowering below said predetermined fluid level as a result of gas build up within the compartment, and an open position in which the lever arm hingedly moves away from the cap and annular rim in response to the fluid level in the compartment lowering substantially below said predetermined level.

2. The automatic vent set forth in claim 1, said moving means comprising a float that moves in response to changing water level in the compartment of the cup.

3. The automatic vent set forth in claim 2, said float including a body portion and an upwardly projecting arm portion, said lever arm of the valve assembly being connected at its other end to the arm portion of the float.

4. The automatic vent set forth in claim 1, said means for introducing fluid into the compartment comprising an inlet formed in the bottom wall of the cup, said inlet being in fluid communication with a fluid system.

5. The automatic vent set forth in claim 1, said annular rim having a beveled surface.

6. The automatic vent set forth in claim 1, said lever arm being hingedly movable about a first pivot point when moving between its closed position and its partially open position, and a second pivot point when moving between its partially open position and its open position.

7. The automatic vent set forth in claim 6, said first pivot point being in closer proximity to the bore of the cap than the second pivot point.

8. An automatic vent comprising:
    a cup including a bottom wall and a side wall, said bottom and side walls defining a compartment having an open top; and
    a valve assembly comprising:
        a cap disposed proximate the open top of the cup, the cap having a body including a first surface and a second surface, a bore formed in the body to provide a passage between said first surface and said second surface and a rim formed around the bore on the second surface of the body;
        a lever arm hingedly coupled to the second surface of the body of the cap; and
        a float coupled to said lever arm;
    wherein said valve assembly is constructed and arranged such that:
        a) when a level of fluid within said compartment reaches a first fluid level, said lever arm contacts said rim to block said bore, thereby preventing said fluid from entering said passage;
        b) when a level of fluid falls below said first fluid level, said lever arm pivots about a contact point between said lever arm and said rim, thereby partially opening said passage to allow fluid to pass through said passage; and
        c) when a level of fluid falls below a second fluid level, said lever arm pivots about a contact point between said lever arm and said body of said cap thereby fully opening said passage to allow fluid to pass through said passage.

9. The automatic vent of claim 8, said float comprising a body portion and an arm portion, said arm portion being coupled to said lever arm of the valve assembly.

10. The automatic valve of claim 8, further comprising an inlet formed in the bottom wall of said cup, said inlet being for allowing fluid from a fluid system to flow into said compartment.

11. The automatic vent of claim 8, wherein said first and second contact points and a center point of said bore lie in a common plane.

12. The automatic vent of claim 8, wherein, as the level of fluid falls below said first fluid level, the surface area of a cylinder formed between said second surface of said body and said lever arm and having a circumference and center axis which is the same as the circumference and center axis of said bore is greater than the cross-sectional area of said bore.

13. The automatic vent of claim 8, said rim having a beveled surface.

* * * * *